US007347182B2

(12) United States Patent
Vogel et al.

(10) Patent No.: US 7,347,182 B2
(45) Date of Patent: Mar. 25, 2008

(54) INJECTOR DOUBLE ROW CLUSTER CONFIGURATION FOR REDUCED SOOT EMISSIONS

(75) Inventors: Stefan Vogel, Aachen (DE); Sherif H. El Tahry, Troy, MI (US); Carl-Anders Hergart, Peoria, IL (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/399,683

(22) Filed: Apr. 6, 2006

(65) Prior Publication Data
US 2006/0261193 A1 Nov. 23, 2006

Related U.S. Application Data

(60) Provisional application No. 60/669,129, filed on Apr. 6, 2005.

(51) Int. Cl.
F02M 63/00 (2006.01)
F02M 61/00 (2006.01)
(52) U.S. Cl. ............... 123/305; 123/467; 239/533.12
(58) Field of Classification Search ........ 123/298–300, 123/276, 467, 305; 239/533.12, 585.5, 88
See application file for complete search history.

(56) References Cited

U.S. PATENT DOCUMENTS

| | | | | |
|---|---|---|---|---|
| 4,919,093 | A | | 4/1990 | Hiraki et al. ............... 123/299 |
| 5,054,456 | A | | 10/1991 | Rush, II et al. ............. 123/531 |
| 6,279,840 | B1 | * | 8/2001 | Buckley .................. 239/533.4 |
| 6,338,445 | B1 | * | 1/2002 | Lambert et al. ....... 239/533.12 |
| 6,467,702 | B1 | * | 10/2002 | Lambert et al. ....... 239/533.12 |
| 6,553,960 | B1 | | 4/2003 | Yoshikawa et al. ......... 123/299 |
| 6,616,070 | B1 | * | 9/2003 | Kunkulagunta ........ 239/533.12 |
| 6,644,268 | B2 | * | 11/2003 | Konig et al. ................ 123/299 |
| 6,659,074 | B2 | | 12/2003 | Lippert et al. .............. 123/299 |
| 6,758,407 | B1 | * | 7/2004 | Lambert et al. ................ 239/5 |
| 6,758,415 | B2 | | 7/2004 | Fischer et al. ........... 239/533.2 |
| 6,971,592 | B2 | * | 12/2005 | Boecking ................. 239/533.2 |
| 7,032,566 | B2 | | 4/2006 | Cavanagh et al. .......... 123/299 |
| 7,044,406 | B2 | * | 5/2006 | Sander-Potz et al. .... 239/533.2 |
| 7,063,272 | B2 | * | 6/2006 | Cooke et al. ................. 239/88 |
| 7,143,738 | B2 | * | 12/2006 | Ganz et al. ................ 123/295 |
| 7,143,964 | B2 | * | 12/2006 | Kuegler ................. 239/533.12 |

(Continued)

OTHER PUBLICATIONS

PCT International Search Report, PCT/US06/12757 filed Apr. 6, 2006, mailed Aug. 28, 2006.
"Spray Characteristics of Group-hole Nozzle for D.I. Diesel Engine", Zhang, et al, SAE 2003-01-3115 pp. 1-9.
"The Effects of Multirow Nozzles on Diesel combustion", Bergstrand, et al, 2003 SAE World Congress Mar. 3-6, 2003, 2003-1-0701, pp. 1-15.

*Primary Examiner*—Hai Huynh

(57) ABSTRACT

A direct injection fuel injector system includes a fuel injector defining nozzle holes in an optimized cluster configuration. Each hole of a conventional multi-hole nozzle is replaced by two smaller, closely spaced holes in a two-hole-per-cluster configuration. The holes within a cluster are configured one above the other, in two horizontal planes or rows, spaced a distance apart from one another. The distance "d" between the nozzle holes in the cluster configuration, the clustered plume angle "α", which is the angular separation between the centerlines of the nozzle holes, as well as the included spray angle "β", are optimized through computational fluid dynamics and combustion modeling so that an optimal compromise can be found between liquid penetration, spray penetration and air entrainment, whereby to minimize soot emissions.

18 Claims, 2 Drawing Sheets

U.S. PATENT DOCUMENTS

| | | |
|---|---|---|
| 7,159,799 B2 * | 1/2007 | Cooke .................. 239/533.12 |
| 2005/0120995 A1 | 6/2005 | Tsujimoto et al. .......... 123/299 |
| 2005/0189440 A1 * | 9/2005 | Cooke et al. .......... 239/533.12 |
| 2005/0224606 A1 * | 10/2005 | Dingle .................... 239/533.2 |

* cited by examiner

FIG. 1
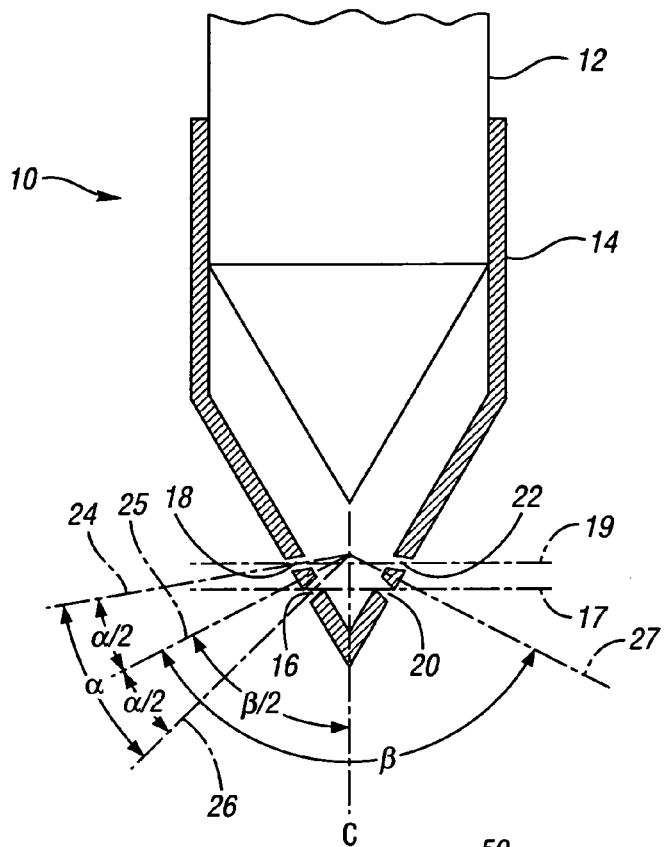
FIG. 2
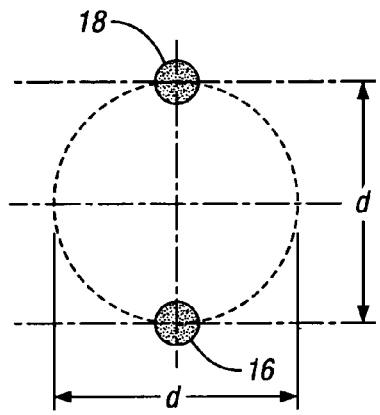
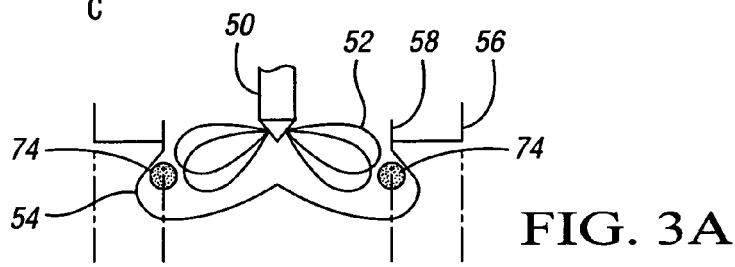
FIG. 3A
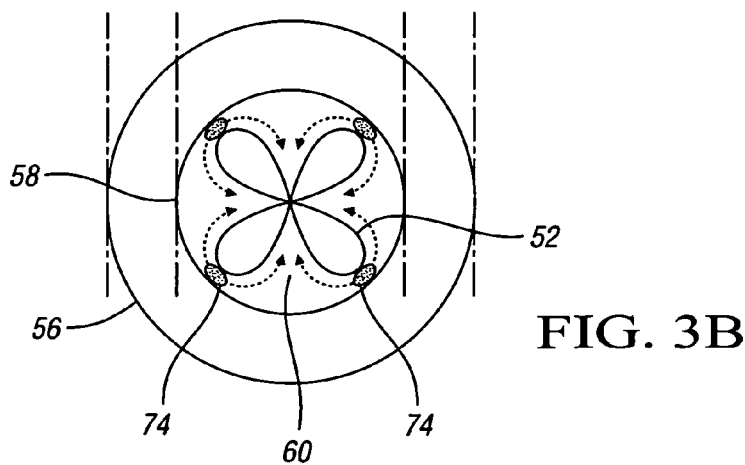
FIG. 3B

INJECTOR DOUBLE ROW CLUSTER CONFIGURATION FOR REDUCED SOOT EMISSIONS

CROSS REFERENCE TO RELATED APPLICATION

This application claims the benefit of U.S. Provisional Patent Application No. 60/669,129, filed Apr. 6, 2005, and which is hereby incorporated by reference in its entirety.

TECHNICAL FIELD

The present invention relates to a direct injection fuel injector system with nozzle holes in an optimized cluster configuration.

BACKGROUND OF THE INVENTION

Direct injection engines have an open combustion chamber into which fuel is injected directly. In a direct injection engine, such as a diesel or spark ignition direct engine operating with multi-hole nozzles, the injected fuel meets a high-temperature and high-pressure environment. In order to ensure a clean and efficient combustion process, the injected fuel needs to mix rapidly with the surrounding air. This constitutes a particular challenge in situations where excessive external exhaust gas recirculation (EGR) is applied to control emissions of nitrogen oxides (NOx).

Recent interest in fuel efficiency and federally mandated emission requirements has refocused efforts to develop highly efficient, low emission engines and modes of operation. In view of possible future stringent emissions legislation, particularly pertaining to nitrogen oxides (NOx), it is necessary to operate the engine at high EGRs. However, this generally has a negative influence on soot emission due to limited oxygen availability during the combustion process.

SUMMARY OF THE INVENTION

The present invention aims at addressing the need for creating a fuel injection system enabling smaller holes while maintaining sufficient, while not excessive, spray penetration. In the present invention, each hole of a conventional multi-hole nozzle is replaced by two smaller, closely spaced holes in a cluster configuration. The holes within a cluster are configured one above the other, in two horizontal planes or rows, spaced a distance apart from one another. The distance "d" between the nozzle holes in the cluster configuration, the clustered plume angle "$\alpha$", which is the angular separation between the centerlines of the nozzle holes, as well as the included spray angle "$\beta$", are subject to optimization. "$\alpha$" and "d" influence mainly the soot formation, whereas "$\beta$" the included spray angle, is chosen such that the soot oxidation is maximized. The results of a computational fluid dynamics analysis indicate that angle $\alpha$ set at 20 degrees results in an optimized cluster distribution. By utilizing clusters of holes, the layout of which is subject to careful optimization through computational fluid dynamics and combustion modeling, an optimal compromise can be found between liquid penetration, spray penetration and air entrainment, while minimizing soot emissions.

Specifically, the invention provides a fuel injector assembly for an engine including a fuel injector defining an outlet cluster having a first opening defined within a first plane and a second opening defined within a second plane. The second plane is parallel to and spaced from said first plane. The fuel injector is operable to emit a first plume through the first opening, and a second plume through the second opening, with the first and second plumes intermixing to form a cluster plume effective for reducing soot emissions. Preferably, the first and second planes are substantially horizontal. The second plane is preferably spaced from the first plane by a distance, with the distance being such that the cluster plume has a hydraulic flow rate substantially equivalent to that of a single plume having been delivered from a single opening, while resulting in lower overall soot formation. The first plume may exit the first opening in a first direction, with the second plume exiting the second opening in a second direction, with the first and second directions defining an angular separation therebetween. The angular separation is preferably twenty degrees.

The fuel injector may further define a second outlet cluster having a third opening defined within a third plane and a fourth opening defined within a fourth plane. The fourth plane is preferably parallel to and spaced from the third plane. The fuel injector is preferably operable to emit a third plume through the third opening and a fourth plume through the fourth opening, with the third and fourth plumes preferably intermixing to form a second cluster plume effective for reducing soot emissions. In one aspect of the invention, the first and third planes are coextensive, while the second and fourth planes are coextensive, such that the openings are arranged in two rows about the fuel injector. In another aspect of the invention, the outlet cluster and the second outlet cluster have substantially equivalent spray angles, such that the outlet cluster and the second outlet cluster are substantially symmetrically arranged about the fuel injector.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic cross sectional view through an injector showing the one-to-one "vertical" cluster configuration;

FIG. 2 is a schematic fragmentary cross sectional view showing the distance "d" between the nozzle holes;

FIG. 3A is a schematic side view of a cylinder bowl with clustered plumes formed by nozzle holes in a "vertical" or spaced two-hole-per-cluster configuration;

FIG. 3B is a schematic top view of the clustered plumes formed in the cylinder bowl in FIG. 3A;

DESCRIPTION OF THE PREFERRED EMBODIMENTS

Figure 4A:
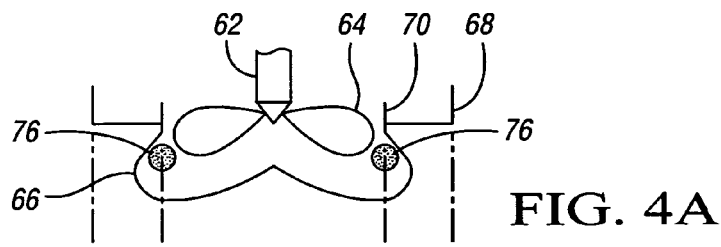
FIG. 4A is a schematic side view of single plumes formed in the cylinder bowl by a plurality of non-clustered evenly spaced single nozzle holes.

Referring to the drawings, wherein like numerals represent like parts, FIG. 1 illustrates a schematic cross-sectional view through an injector system 10 having an injector needle 12 and an injector body 14. As used herein, terms such as "vertical" and "horizontal" describe the injector system 10 with respect to FIG. 1 of the drawings. It should be appreciated that the system 10 could be oriented differently without compromising the inventive concept. A first outlet cluster includes first and second openings 16, 18. As shown in FIG. 1, the first opening 16 generally lies in a first horizontal plane 17, while the second opening 18 generally lies in a second horizontal plane 19, with the two planes 17, 19 spaced a distance apart from one another. Thus the openings 16, 18 constituting the first outlet cluster are shown in a "vertical cluster configuration" when viewed in FIG. 2. Put another way, the injector needle 12 preferably defines a centerline C, with the first opening 16, the second opening 18, and the centerline C all defining a plane (i.e., the plane of the paper as viewed from FIG. 1), such that the first opening 16 is directly "below" the second opening 18 in the direction of the centerline C.

While the invention will generally be described with respect to only the first outlet cluster, the system 10 preferably includes multiple outlet clusters. For instance, a second outlet cluster includes a third opening 20 shown lying in the first plane 17, and a fourth opening 22 shown lying in the second plane 19. Additional outlet clusters may also be utilized, with each cluster including two openings spaced a distance from one another. It should be appreciated that the nozzle holes 20, 22 of the second cluster could be in different horizontal planes than the nozzle holes 16, 18 of the first cluster without changing the inventive concept. The so-called vertical configuration of the openings within each cluster maximizes the separation between clusters, thus limiting the interaction between the sprays and maximizing air utilization. In this embodiment, the planes 17 and 19 are vertically spaced a distance apart from one another. In another embodiment, the planes may be spaced apart in a different direction or orientation.

The injector system 10 is preferably operable to emit a first plume through the first opening 16 and a second plume through the second opening 18, with the first and second plumes intermixing to form a first cluster plume effect as described herein. The system 10 may have either one common inlet for the openings 16, 18, or separate inlets may be utilized. While the openings 16, 18 have been described to lie within a corresponding horizontal plane 17, 19, the openings 16, 18 are preferably configured such that the first and second plumes exit at predetermined angles. For instance, the first plume exits the first opening 16 along a centerline 26, while the second plume exits the second opening 18 along a centerline 24. A clustered plume angle α can then be defined as the angular separation between the centerlines 24, 26 of the openings 16, 18 within the first cluster, with α/2 then representing the distance between each centerline 24, 26 and the effective centerline 25 of the first cluster plume.

Preferably, the injector system 10 is also operable to emit a third plume through the third opening 20 and a fourth plume through the fourth opening 22, with the third and fourth plumes also intermixing to form a cluster plume having an effective centerline shown at 27. When more than one cluster is included within the system 10, an included spray angle β can be defined as the angle between the effective centerline of the first cluster plume (i.e., 25) and the effective centerline of the second cluster plume (i.e., 27). β and β/2 are shown in FIG. 1. Preferably, the clusters are arranged symmetrically about the injector body 14.

FIG. 2 is a fragmentary cross-sectional view showing the linear distance d between the first and second openings 16 and 18; that is, d is the "vertical" distance between "horizontal" planes 17 and 19 of FIG. 1. The distance d between the openings 16, 18 constituting the cluster, the clustered plume angle α, the included spray angle β, and the number of clusters are subject to optimization. The amount of soot formation is mainly influenced by α and d, whereas β is preferably chosen to maximize soot oxidation. More particularly, angle β governs spray targeting, which is how an individual cluster configuration is configured relative to the piston and the in-cylinder flow field. Late cycle soot oxidation is largely governed by the flow field generated by a certain piston bowl configuration and other parameters as known in the art, such as port configuration, injector configuration, and operating conditions such as injector pressure, to name a few. Representative values for the optimizable parameters are 0.2 mm for d, 150 degrees for β, and 20 degrees for α, with at least five clusters.

FIG. 3A presents a schematic side view of a cylinder bowl with clustered plumes formed by a plurality of cluster plumes exiting an injector 50 through openings configured in a "vertically" spaced two-hole-per-cluster configuration, as described with respect to FIG. 1. FIG. 3B is a schematic top view of the clustered plumes formed in the cylinder bowl of FIG. 3A. The injector 50 is operable to inject plumes 52 into the cylinder bowl, which has a contour shown at 54. A cylinder liner 56 and piston bowl rim 58 are also shown in FIGS. 3A and 3B. The arrows at 60 illustrate the path of air flow ahead of the spray plume. Regions of low back pressure are indicated at 74, with back pressure being the pressure between the tip of the spray plume and the bowl rim 70.

Figure 4B:
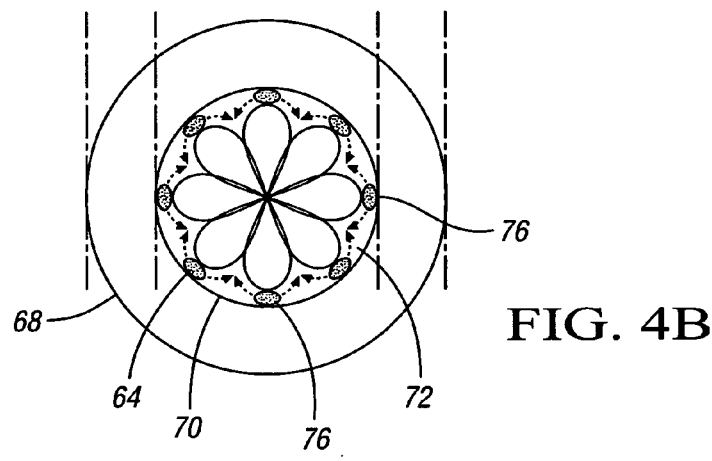
FIG. 4B is a schematic top view of the single plumes formed in the cylinder bowl in FIG. 4A.

In contrast, FIG. 4A is a schematic side view of a cylinder bowl with single plumes formed by a plurality of non-clustered, evenly spaced, single nozzle openings within an injector 62. FIG. 4B is a schematic top view of the single plumes formed in the cylinder bowl in FIG. 4A. The injector 62 is operable to inject plumes 64 into the cylinder bowl, which has a contour at 66. A cylinder liner 68 and piston bowl rim 70 are also shown in FIGS. 4A and 4B. The arrows at 72 illustrate the path of air flow ahead of the spray plume. Regions of high back pressure are indicated at 76. Thus while the evenly spaced openings forming the plumes shown in FIGS. 4A and 4B allow for a hydraulic flow rate equivalent to that of the vertical cluster configuration shown in FIGS. 3A and 3B, the non-clustered evenly spaced single opening arrangement of FIGS. 4A and 4B leads to more pressure regions and higher back pressure. Thus, it can be seen that the vertical two-hole-per-cluster configuration is operable to improve jet penetration within an engine by reducing back pressure.

Figure 5A:
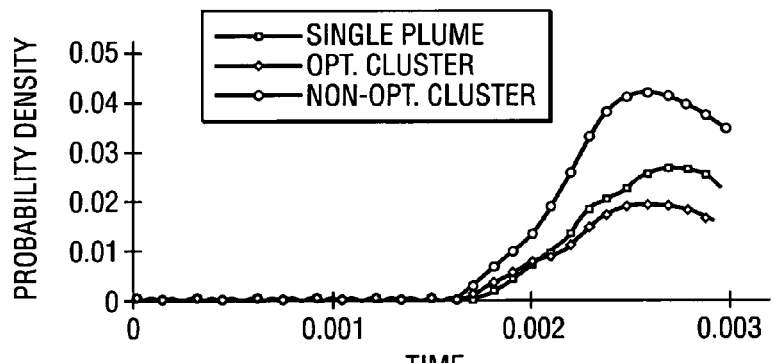
FIG. 5A is a graph comparing soot emission concentration over time for three nozzle configurations in a numerical experiment: a conventional single-hole nozzle, an optimized two-hole-per-cluster configuration, where the clustered plume angle $\alpha$ is 20 degrees, and a non-optimized two-hole-per-cluster configuration, where the clustered plume angle $\alpha$ is 10 degrees.

Referring to FIG. 5A, a graph of soot emission concentration in arbitrary units (A.U.) is shown with respect to time (in seconds) for three nozzle configurations in a numerical experiment: a conventional single-hole nozzle (i.e., a configuration as discussed with respect to FIGS. 4A and 4B), an optimized two-hole-per-cluster configuration, where the clustered plume angle α is 20 degrees, and a non-optimized two-hole-per-cluster configuration, where the clustered plume angle α is 10 degrees. The optimized two-hole-per-cluster configuration has the lowest overall soot emission. The results shown are taken from a computational fluid dynamics analysis and demonstrate the importance of properly optimizing the cluster configuration.

Figures 5B, 5C, 5D:
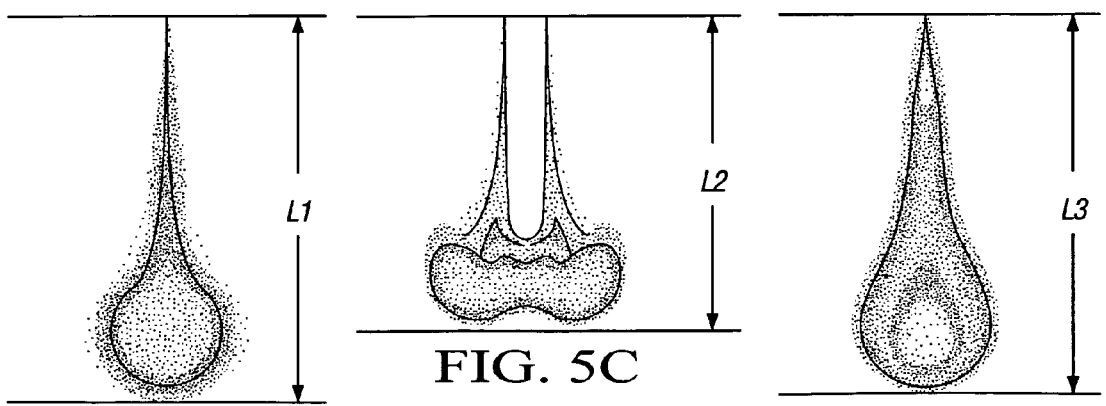
FIG. 5B illustrates the pattern of soot formation in a conventional unclustered single-hole nozzle plume.
FIG. 5C illustrates the pattern of soot formation in an optimized two-hole-per-cluster configuration, where the clustered plume angle $\alpha$ is 20 degrees.
FIG. 5D illustrates the pattern of soot formation in a non-optimized two-hole-per-cluster configuration, where the clustered plume angle α is 10 degrees.

FIG. 5B illustrates the pattern of soot formation in a conventional unclustered single-hole nozzle plume, which has a vapor penetration denoted by L1. FIG. 5C illustrates the pattern of soot formation in an optimized two-hole-per-cluster configuration, where the clustered plume angle α is 20 degrees, which has a vapor penetration denoted by L2. FIG. 5D illustrates the pattern of soot formation in a non-optimized two-hole-per-cluster configuration, where the clustered plume angle α is 10 degrees, which has a vapor penetration denoted by L3. As can be seen in FIGS. 5B-D, the jet penetration is lowest in the optimized cluster configuration. This potential shortcoming, at primarily full load, may be addressed by careful layout of the clusters relative to each other in the engine. Further computational fluid dynamics analysis indicates that configuring the openings within a cluster in two rows, or two horizontal planes spaced vertically or one above the other, rather than horizontally in a single row or single horizontal plane, offers significant advantages regarding spray penetration and air utilization in an engine. The vertical spacing maximizes the separation between the two-hole clusters. This leads to improved penetration by allowing displaced air ahead of the spray tip to escape, thus limiting pressure build-up in front of the penetration jet, as seen in FIG. 3B.

This concept is particularly well suited if the engine is operated in the so-called Premixed Charge Compression Ignition (PCCI) mode. The PCCI mode of combustion incorporates a standard compression ignition combustion system with high rates of aggressively cooled exhaust gas recirculation (EGR) and an early start of injection (SOI) timing. The PCCI mode has a greater chance of exhibiting excessive liquid wall impingement. The two-hole-per-cluster configuration operates to improve combustion. By properly selecting the parameters in the mentioned cluster configuration, which is achieved through numerical optimization, an optimal trade-off can be made between liquid penetration at full load, minimum wall impingement at part load, sufficient air entrainment and mixing throughout the load range.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A fuel injector assembly for an engine comprising:
   an injector body;
   a fuel injector defining a first outlet cluster having a first opening defined within a first plane and a second opening defined within a second plane, said second plane being parallel to and spaced from said first plane;
   wherein said fuel injector is operable to emit a first plume through said first opening and a second plume through said second opening, said first and second plumes intermixing to form a first cluster plume effecting reduced soot emissions;
   wherein said first plume exits said first opening along a first axis in a first direction and said second plume exits said second opening along a second axis in a second direction, said first and second directions defining an angular separation therebetween; and
   wherein said first axis and said second axis intersect at a point internal to said injector body.

2. The fuel injector assembly of claim 1, wherein said angular separation is approximately twenty degrees.

3. The fuel injector assembly of claim 1, wherein said fuel injector further defines a second outlet cluster having a third opening defined within said first plane and a fourth opening defined within said second plane,
   wherein said fuel injector is operable to emit a third plume through said third opening, and a fourth plume through said fourth opening, said third and fourth plumes intermixing to form a second cluster plume effecting reduced soot emissions.

4. The fuel injector assembly of claim 3, wherein said first and second outlet clusters are substantially symmetrically arranged about said fuel injector.

5. The fuel injector assembly of claim 3, wherein said first and second cluster plumes define an included spray angle therebetween.

6. The fuel injector assembly of claim 5, wherein said included spray angle is between 110 and 160 degrees.

7. The fuel injector assembly of claim 1, wherein said first opening is substantially directly below said second opening in a direction parallel with a centerline of said assembly.

8. The fuel injector assembly of claim 1, wherein said distance is approximately 0.2 millimeters.

9. A fuel injector assembly for an engine comprising:
   an injector body;
   a fuel injector defining an outlet cluster including a first opening and a second opening spaced from said first opening by a distance, said fuel injector operable to emit a first plume through said first opening and a second plume through said second opening;
   wherein said distance is such that said first plume and said second plume intermix to form a cluster plume, said cluster plume resulting in lower overall soot formation than a single plume having been delivered through a single opening at a substantially equivalent flow rate;
   wherein said first plume exits said first opening along a first axis in a first direction and said second plume exits said second opening along a second axis in a second direction, said first and second directions defining an angular separation therebetween; and
   wherein said first axis and said second axis intersect at a point internal to said injector body.

10. The fuel injector assembly of claim 9, wherein said distance is approximately 0.2 millimeters.

11. The fuel injector assembly of claim 9, wherein said fuel injector defines a plurality of said outlet clusters arranged substantially symmetrically about said fuel injector.

12. The fuel injector assembly of claim 9, wherein said distance and said angular separation are selected to maximize air utilization and minimize soot formation during emission of said first and second plumes.

13. The fuel injector assembly of claim 9, wherein said angular separation is approximately twenty degrees.

14. A fuel injector assembly for an engine operable in a premixed charge compression ignition mode, said fuel injector assembly comprising:

an injector body;

a fuel injector defining at least one outlet cluster having a first opening defined within a first plane and a second opening defined within a second plane parallel to said first plane and spaced from said first plane by a distance;

wherein said fuel injector is operable to emit a first plume through said first opening and a second plume through said second opening, said first and second plumes intermixing to form a cluster plume;

wherein said distance is such that said cluster plume results in lower overall soot formation than a single plume having been delivered from a single opening at a substantially equivalent flow rate; and wherein said first plume exits said first opening along a first axis in a first direction and said second plume exits said second opening along a second axis in a second direction, said first and second directions defining an angular separation therebetween; and wherein said first axis and said second axis intersect at a point internal to said injector body.

15. The fuel injector assembly of claim 14, wherein said first and second planes are substantially horizontal.

16. The fuel injector assembly of claim 14, wherein said fuel injector defines a plurality of said at least one outlet clusters arranged substantially symmetrically thereabout.

17. The fuel injector assembly of claim 14, wherein said angular separation is approximately twenty degrees.

18. The fuel injector assembly of claim 14, wherein said distance is approximately 0.2 millimeters.

* * * * *